(12) United States Patent
Enke

(10) Patent No.: US 10,704,444 B2
(45) Date of Patent: Jul. 7, 2020

(54) INJECTOR FLUID FILTER WITH UPPER AND LOWER LIP SEAL

(71) Applicant: Tenneco Automotive Operating Company Inc., Lake Forest, IL (US)

(72) Inventor: Olaf Enke, Clinton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 108 days.

(21) Appl. No.: 16/106,891

(22) Filed: Aug. 21, 2018

(65) Prior Publication Data

US 2020/0063624 A1 Feb. 27, 2020

(51) Int. Cl.
*F01N 3/20* (2006.01)

(52) U.S. Cl.
CPC .......... *F01N 3/208* (2013.01); *F01N 2390/02* (2013.01); *F01N 2610/01* (2013.01); *F01N 2610/02* (2013.01); *F01N 2610/146* (2013.01); *F01N 2610/148* (2013.01)

(58) Field of Classification Search
CPC ................ F01N 3/208; F01N 2610/01; F01N 2610/146; F01N 2390/02; F01N 2610/02; F01N 2610/148
See application file for complete search history.

(56) References Cited

U.S. PATENT DOCUMENTS

| 702,770 | A | 6/1902 | Barrington |
|---|---|---|---|
| 2,235,834 | A | 3/1941 | Gillette et al. |
| 2,637,344 | A | 5/1953 | Matthews |
| 3,771,819 | A | 11/1973 | Hitchins, III et al. |
| 3,927,984 | A | 12/1975 | Hartley |
| 3,958,757 | A | 5/1976 | Happel et al. |
| 4,179,069 | A | 12/1979 | Knapp et al. |
| 4,215,820 | A | 8/1980 | Renger |
| 4,292,947 | A | 10/1981 | Tanasawa et al. |
| 4,499,878 | A | 2/1985 | Igashira et al. |
| 4,610,080 | A | 9/1986 | Hensley |
| 4,625,919 | A | 12/1986 | Soma et al. |

(Continued)

FOREIGN PATENT DOCUMENTS

| CN | 101378838 A | 3/2009 |
|---|---|---|
| CN | 101389836 A | 3/2009 |

(Continued)

OTHER PUBLICATIONS

Written Opinion issued in related PCT/US2019/043580 dated Nov. 14, 2019.

(Continued)

*Primary Examiner* — Matthew T Largi
(74) *Attorney, Agent, or Firm* — Harness, Dickey & Pierce, P.L.C.

(57) ABSTRACT

An injector for injecting a reagent includes an axially translatable valve member positioned within a housing. A flux sleeve is surrounded by a coil of an electromagnet. A pole piece defines a return passageway for reagent to flow. A filter surrounds the pole piece and includes a cage and a mesh fixed to the cage. The cage includes a deformable first seal biasedly engaging an outer surface of the pole piece. The cage includes a second seal biasedly engaging the housing. The first and second seals define a closed volume such that all of the reagent flowing through the injector passes through the mesh.

20 Claims, 7 Drawing Sheets

(56) References Cited

U.S. PATENT DOCUMENTS

| | | |
|---|---|---|
| 4,717,080 A | 1/1988 | Sauer |
| 4,742,964 A | 5/1988 | Ito et al. |
| 4,805,837 A | 2/1989 | Brooks et al. |
| 4,869,429 A | 9/1989 | Brooks et al. |
| 4,887,769 A | 12/1989 | Okamoto et al. |
| 4,938,455 A | 7/1990 | Grohmann |
| 4,982,902 A | 1/1991 | Knapp et al. |
| 5,114,116 A | 5/1992 | Muller et al. |
| 5,307,997 A | 5/1994 | Wakeman |
| 5,325,838 A | 7/1994 | Bennett |
| 5,522,218 A | 6/1996 | Lane et al. |
| 5,570,841 A | 11/1996 | Pace et al. |
| 5,571,248 A | 11/1996 | Seetharaman et al. |
| 5,605,042 A | 2/1997 | Stutzenberger |
| 5,687,698 A | 11/1997 | Mastro et al. |
| 5,713,327 A | 2/1998 | Tilton et al. |
| 5,857,478 A | 1/1999 | Davison et al. |
| 5,884,611 A | 3/1999 | Tarr et al. |
| 5,924,280 A | 7/1999 | Tarabulski |
| 5,943,858 A | 8/1999 | Hofmann et al. |
| 5,950,932 A | 9/1999 | Takeda et al. |
| 5,970,953 A | 10/1999 | Lorraine et al. |
| 5,976,475 A | 11/1999 | Peter-Hoblyn et al. |
| 5,979,866 A | 11/1999 | Baxter et al. |
| 5,996,910 A | 12/1999 | Takeda et al. |
| 6,041,594 A | 3/2000 | Brenner et al. |
| 6,063,350 A | 5/2000 | Tarabulski et al. |
| 6,164,322 A | 12/2000 | Najmolhoda et al. |
| 6,168,098 B1 | 1/2001 | Brinn, Jr. |
| 6,192,677 B1 | 2/2001 | Tost et al. |
| 6,206,343 B1 | 3/2001 | Kato et al. |
| 6,257,496 B1 | 7/2001 | Wyant |
| 6,267,796 B1 | 7/2001 | Schottmer |
| 6,273,120 B1 | 8/2001 | Hofmann et al. |
| 6,279,603 B1 | 8/2001 | Czamik et al. |
| 6,293,097 B1 | 9/2001 | Wu et al. |
| 6,382,533 B1 | 5/2002 | Mueller et al. |
| 6,409,102 B1 | 6/2002 | Luttrell et al. |
| 6,454,192 B2 | 9/2002 | Perry |
| 6,470,676 B2 | 10/2002 | Dolling et al. |
| 6,494,388 B1 | 12/2002 | Mueller et al. |
| 6,526,746 B1 | 3/2003 | Wu |
| 6,539,708 B1 | 4/2003 | Hofmann et al. |
| 6,708,904 B2 | 3/2004 | Itatsu |
| 6,739,525 B2 | 5/2004 | Dantes et al. |
| 6,742,330 B2 | 6/2004 | Genderen |
| 6,877,680 B2 | 4/2005 | Bauer et al. |
| 6,922,987 B2 | 8/2005 | Mital et al. |
| 6,988,681 B2 | 1/2006 | Reiter |
| 7,021,558 B2 | 4/2006 | Chenanda et al. |
| 7,100,366 B2 | 9/2006 | Hager et al. |
| 7,237,731 B2 | 7/2007 | Dallmeyer et al. |
| 7,296,781 B2 | 11/2007 | Akabane |
| 7,299,997 B2 | 11/2007 | Sayar |
| 7,306,172 B2 | 12/2007 | Sayar |
| 7,344,090 B2 | 3/2008 | Sayar |
| 7,414,502 B2 | 8/2008 | Tackes et al. |
| 7,467,749 B2 | 12/2008 | Tarabulski et al. |
| 7,469,906 B2 | 12/2008 | Peet et al. |
| 7,503,543 B2 | 3/2009 | Nomichi et al. |
| 7,703,709 B2 | 4/2010 | Akabane et al. |
| 7,861,520 B2 | 1/2011 | Broderick et al. |
| 8,024,922 B2 | 9/2011 | van Vuuren et al. |
| 8,047,452 B2 | 11/2011 | Martin et al. |
| 8,740,113 B2 | 6/2014 | Roessle et al. |
| 8,973,895 B2 * | 3/2015 | Thomas ............... F01N 3/2066 251/129.21 |
| 8,998,114 B2 | 4/2015 | Olivier et al. |
| 9,683,472 B2 | 6/2017 | Thomas et al. |
| 9,759,113 B2 | 9/2017 | Thomas et al. |
| 10,539,057 B2 * | 1/2020 | VanVuuren ............ B01D 53/94 |
| 2002/0001554 A1 | 1/2002 | Czamik et al. |
| 2004/0041112 A1 * | 3/2004 | Goossens ............... B60T 8/363 251/129.07 |
| 2004/0187483 A1 | 9/2004 | Dalla Betta et al. |
| 2006/0108443 A1 | 5/2006 | Huffman et al. |
| 2007/0158917 A1 | 7/2007 | Paykin |
| 2008/0022663 A1 | 1/2008 | Dodge |
| 2008/0180200 A1 | 7/2008 | Gamble |
| 2009/0179087 A1 | 7/2009 | Martin et al. |
| 2009/0301067 A1 | 12/2009 | Dingle et al. |
| 2010/0192913 A1 | 8/2010 | Keidel et al. |
| 2011/0025439 A1 | 2/2011 | Rettinger et al. |
| 2011/0192140 A1 * | 8/2011 | Olivier ............... F01N 3/20 60/274 |
| 2012/0228533 A1 | 9/2012 | Ams et al. |
| 2013/0292498 A1 * | 11/2013 | Olivier ............... F01N 3/2066 239/585.1 |
| 2014/0112806 A1 | 4/2014 | Wright |
| 2015/0082775 A1 | 3/2015 | Burger |
| 2015/0176461 A1 * | 6/2015 | Thomas ............... F01N 3/2066 239/585.1 |
| 2018/0328249 A1 * | 11/2018 | Upadhye ............... F01N 3/2066 |

FOREIGN PATENT DOCUMENTS

| | | |
|---|---|---|
| CN | 101598057 A | 12/2009 |
| DE | 2418227 A1 | 10/1975 |
| DE | 2460111 A1 | 7/1976 |
| DE | 10241697 A1 | 4/2003 |
| DE | 102012221479 A1 | 5/2014 |
| EP | 1111231 A2 | 6/2001 |
| EP | 1291498 A2 | 3/2003 |
| EP | 1907689 B1 | 3/2009 |
| EP | 2336544 A1 | 6/2011 |
| GB | 702770 | 1/1954 |
| JP | S57-204457 U | 12/1982 |
| JP | 60-040777 | 3/1985 |
| JP | H0510221 A | 1/1993 |
| JP | 05-141330 B2 | 6/1993 |
| JP | H0950491 A | 5/1997 |
| JP | 11166410 | 6/1999 |
| JP | 2000337227 A | 12/2000 |
| JP | 2001-342928 A | 12/2001 |
| JP | 2002-525491 A | 8/2002 |
| JP | 2003-083041 | 3/2003 |
| JP | 2003-083053 A | 3/2003 |
| JP | 2003-328735 A | 11/2003 |
| JP | 2004-176586 A | 6/2004 |
| JP | 2005-201158 A | 7/2005 |
| JP | 2006-226162 A | 8/2006 |
| JP | 3888518 B2 | 3/2007 |
| JP | 2008-101564 A | 5/2008 |
| JP | 2009-539026 A | 11/2009 |
| JP | 2010084165 A | 4/2010 |
| KR | 20090094675 A | 9/2009 |
| WO | 9606270 A1 | 2/1996 |
| WO | 00/18491 A1 | 4/2000 |
| WO | 2004029446 A1 | 4/2004 |
| WO | 2005108753 A1 | 11/2005 |
| WO | 2011100337 A2 | 8/2011 |

OTHER PUBLICATIONS

International Search Report issued in related PCT/US2019/043580 dated Nov. 14, 2019.

* cited by examiner

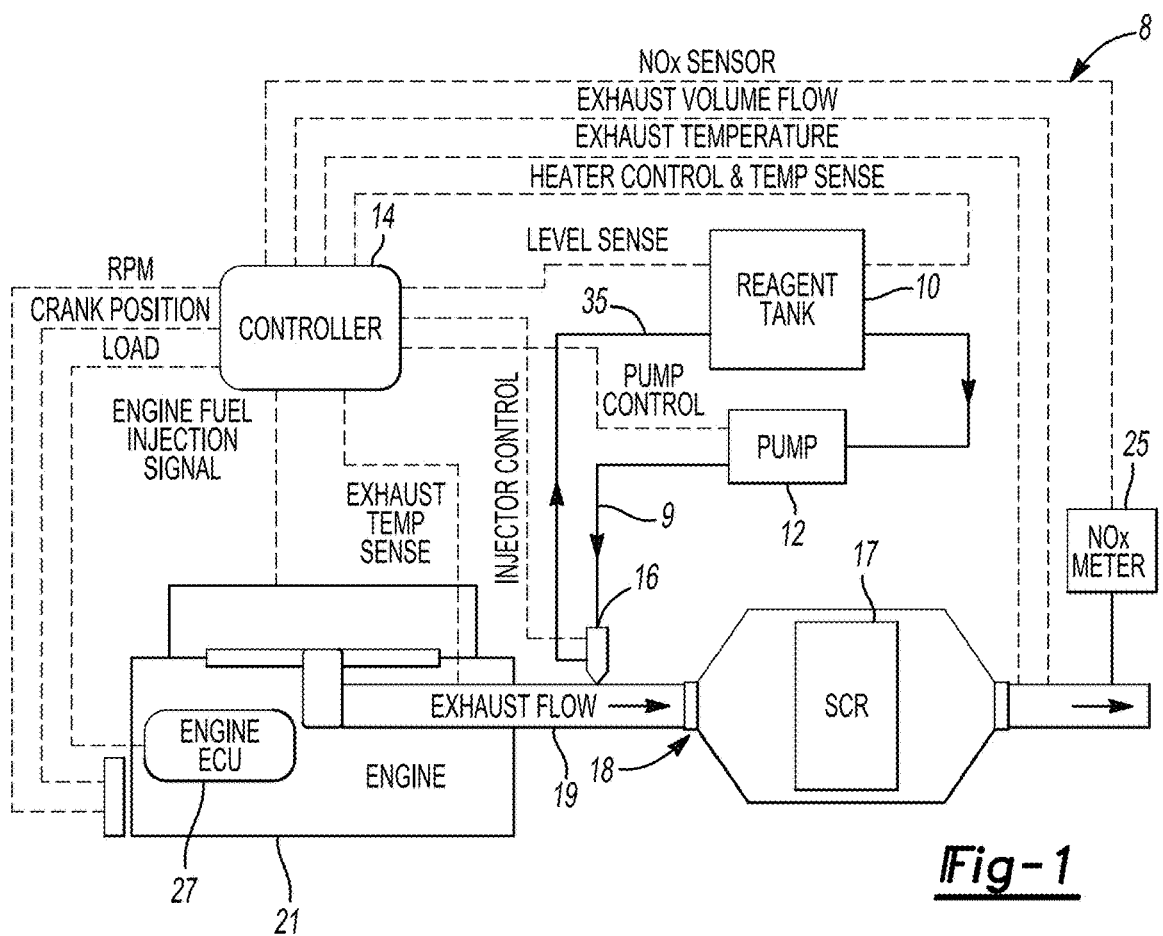
_Fig-1_
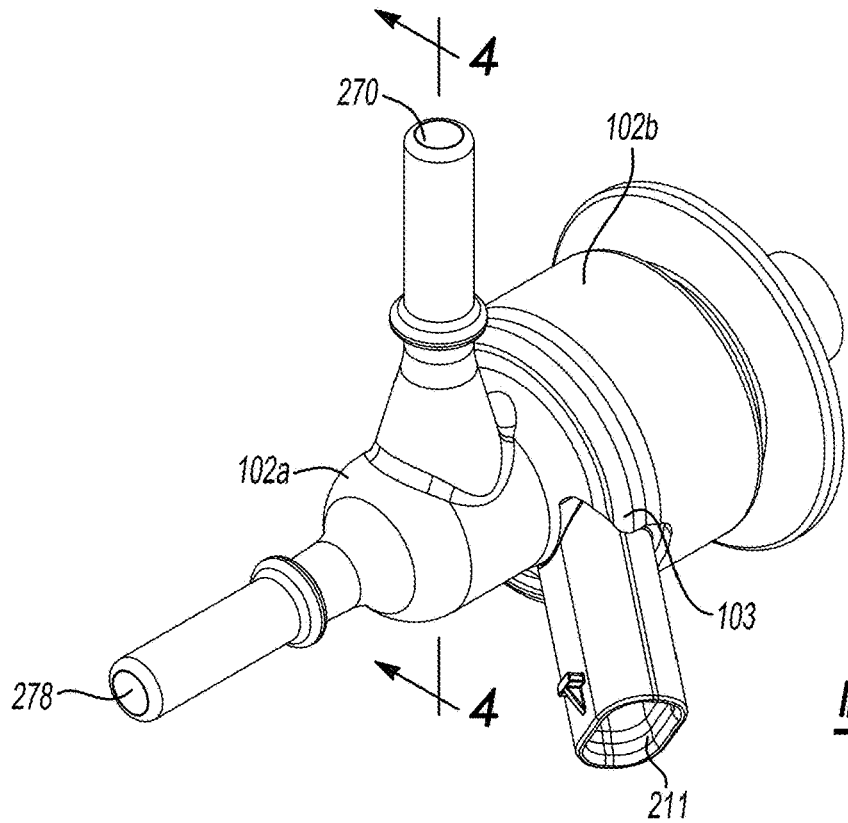
_Fig-2_

INJECTOR FLUID FILTER WITH UPPER AND LOWER LIP SEAL

FIELD

The present disclosure relates to injector systems and, more particularly, relates to an injector system for injecting reagent, such as an aqueous urea solution, into an exhaust stream to reduce oxides of nitrogen ($NO_x$) emissions from diesel engine exhaust.

BACKGROUND

This section provides background information related to the present disclosure which is not necessarily prior art. Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen ($NO_x$).

One method used to reduce $NO_x$ emissions from lean burn internal combustion engines is known as selective catalytic reduction (SCR). SCR, when used, for example, to reduce $NO_x$ emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust $NO_x$ mass flow. The reagent/exhaust gas mixture is passed through a reactor containing a catalyst, such as, for example, activated carbon, or metals, such as platinum, vanadium or tungsten, which are capable of reducing the $NO_x$ concentration in the presence of the reagent.

An aqueous urea solution is known to be an effective reagent in SCR systems for diesel engines. However, use of such an aqueous urea solution involves many disadvantages. Urea is highly corrosive and may adversely affect mechanical components of the SCR system, such as the injectors used to inject the urea mixture into the exhaust gas stream. Urea also may solidify upon prolonged exposure to high temperatures, such as temperatures encountered in diesel exhaust systems. Solidified urea will accumulate in the narrow passageways and exit orifice openings typically found in injectors. Solidified urea may also cause fouling of moving parts of the injector and clog any openings or urea flow passageways, thereby rendering the injector unusable.

In addition, if the urea mixture is not finely atomized, urea deposits will form in the catalytic reactor, inhibiting the action of the catalyst and thereby reducing the SCR system effectiveness. High injection pressures are one way of minimizing the problem of insufficient atomization of the urea mixture. However, high injection pressures often result in over-penetration of the injector spray plume into the exhaust stream, causing the plume to impinge on the inner surface of the exhaust pipe opposite the injector. Over-penetration also leads to inefficient use of the urea mixture and reduces the range over which the vehicle can operate with reduced $NO_x$ emissions. Only a finite amount of aqueous urea can be carried on a vehicle, and what is carried should be used efficiently to maximize vehicle range and reduce the need for frequent replenishment of the reagent.

Several known reagent injectors include a solenoid valve for metering the supply of reagent into the exhaust stream. Typically, a magnetic moveable member of the valve is urged to translate between open and closed positions as an electromagnet is selectively energized and deenergized. The electromagnets of many prior injectors include multiple flux leakage areas resulting in a poorly defined magnetic circuit. Control of the reagent valve may not be optimized using these types of magnetic circuits. The amount of reagent actually dispensed within the exhaust system may vary from a target rate of reagent injection resulting in inefficient use of the onboard reagent. The time required for the valve to cycle from a closed condition, to an opened condition, and back to a closed condition, may be larger than desired due to the magnetic circuit arrangement.

Further, aqueous urea is a poor lubricant. This characteristic adversely affects moving parts within the injector and requires that relatively tight or small fits, clearances and tolerances be employed between adjacent or relatively moving parts within an injector. Aqueous urea also has a high propensity for leakage. This characteristic adversely affects mating surfaces requiring enhanced sealing resources in many locations.

It may be advantageous to provide an improved electromagnetically controlled injector having a well-defined magnetic circuit to improve reagent injection control.

Methods and apparatus of the present disclosure provide the foregoing and other advantages.

SUMMARY

This section provides a general summary of the disclosure, and is not a comprehensive disclosure of its full scope or all of its features.

An injector for injecting a reagent includes an axially translatable valve member positioned within a housing. A flux sleeve is surrounded by a coil of an electromagnet. A pole piece defines a return passageway for reagent to flow. A filter surrounds the pole piece and includes a cage and a mesh fixed to the cage. The cage includes a deformable first seal biasedly engaging an outer surface of the pole piece. The cage includes a second seal biasedly engaging the housing. The first and second seals define a closed volume such that all of the reagent flowing through the injector passes through the mesh.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic depicting an exemplary exhaust aftertreatment system including an electromagnetically controlled reagent injector having a flux bridge and flux break in accordance with the teachings of the present disclosure;

FIG. 2 is a perspective view of the electromagnetically controlled reagent injector;

Corresponding reference numerals indicate corresponding parts throughout the several views of the drawings.

DETAILED DESCRIPTION

Figure 3:
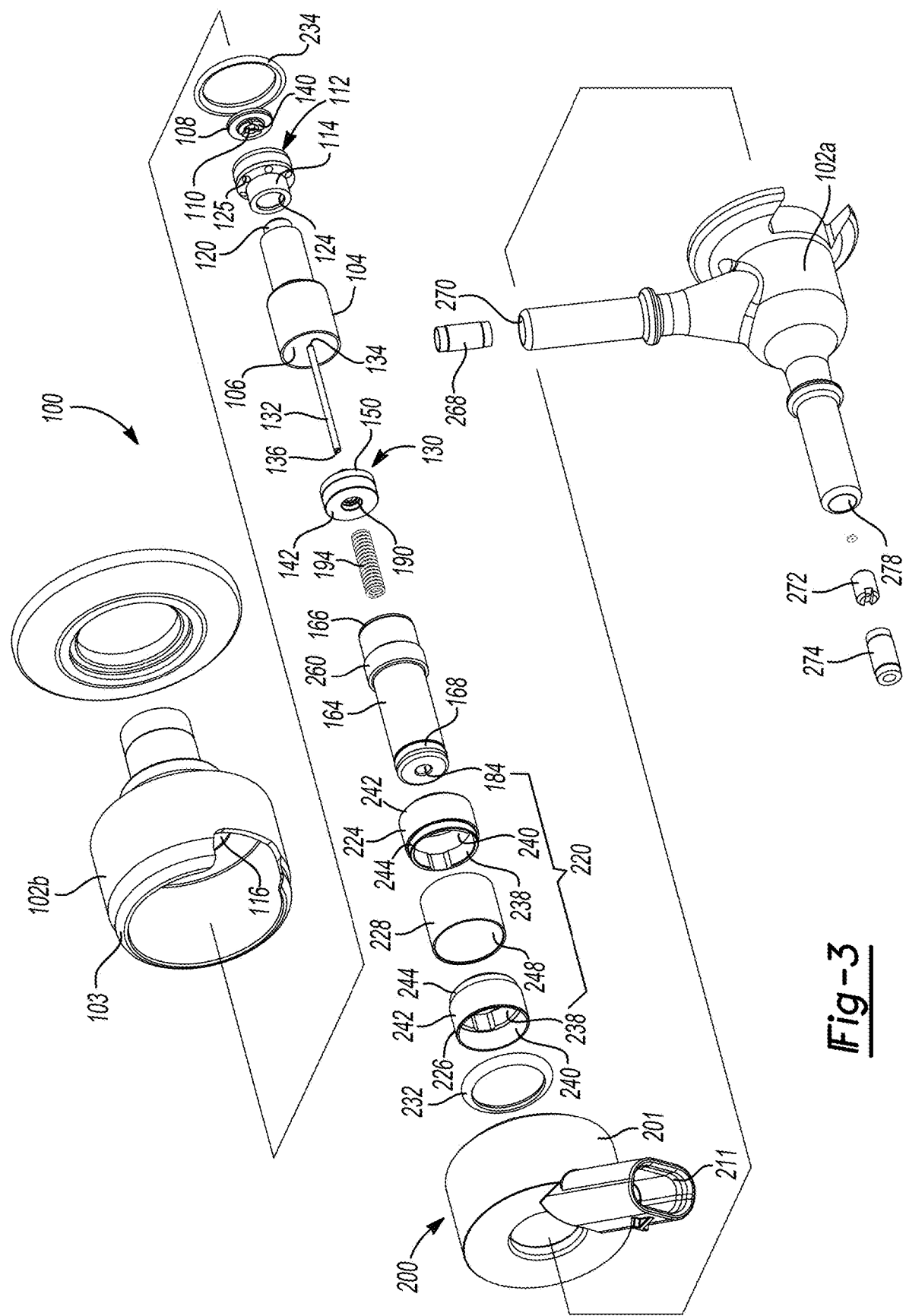
FIG. 3 is an exploded perspective view of the reagent injector.

Example embodiments will now be described more fully with reference to the accompanying drawings.

It should be understood that although the present teachings may be described in connection with diesel engines and the reduction of $NO_x$ emissions, the present teachings may be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Pat. No. 8,047,452, entitled "Method And Apparatus For Injecting Atomized Fluids", which is incorporated herein by reference.

With reference to the FIGS., a pollution control system 8 for reducing $NO_x$ emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 18. Exhaust system 18 includes an exhaust conduit 19 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Figure 4:
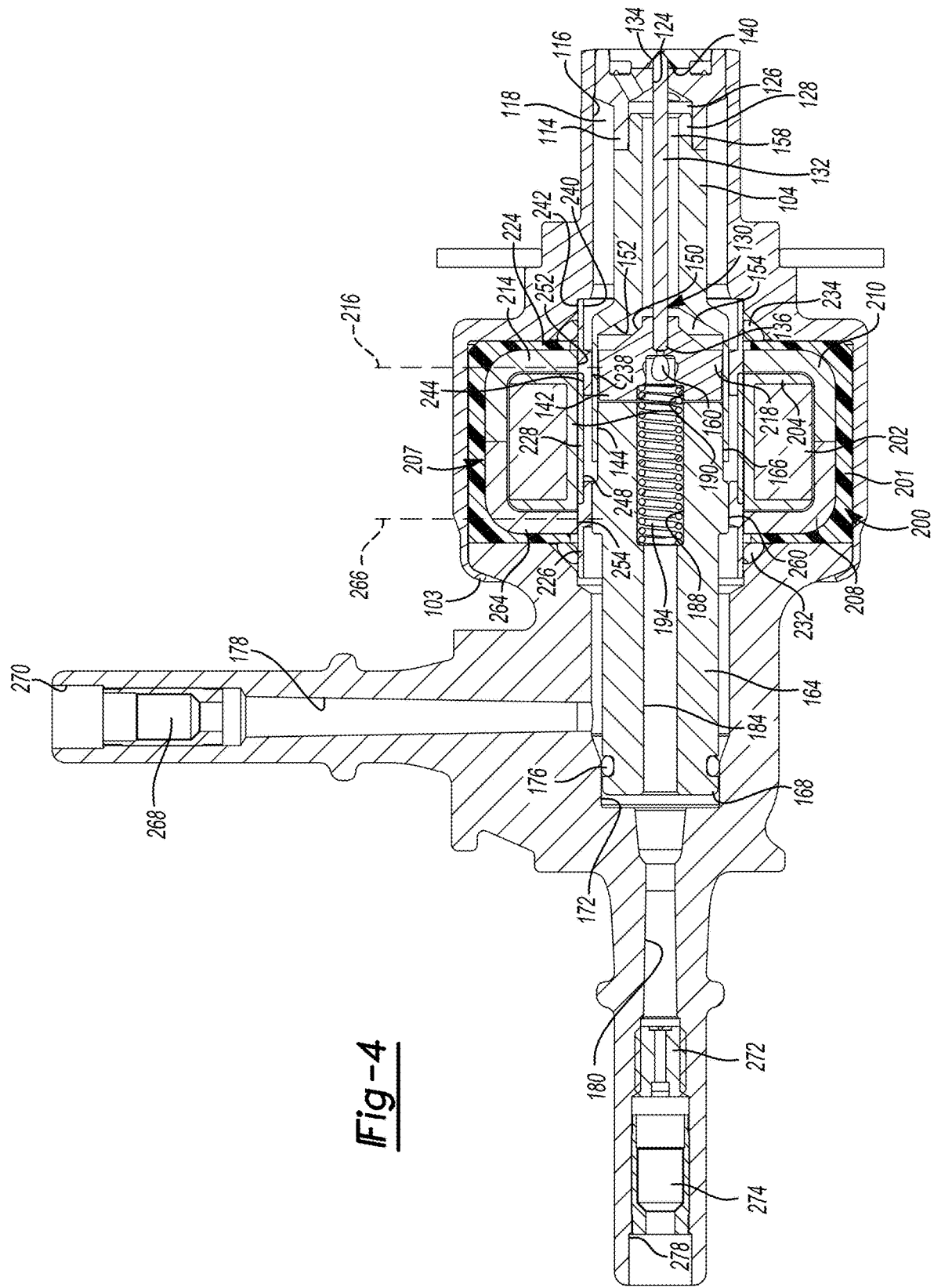
FIG. 4 is a cross-sectional view taken through the injector depicted in FIGS. 2 and 3.

With reference now to FIGS. 2-4, reagent injector 100 will be further described. Reagent injector 100 includes an outer injector body 102 having an outer body upper section 102a and an outer body lower section 102b. Outer body lower section 102b may include a deformable portion 103 that is crimped to outer body upper section 102a. An elongated inner lower body 104 may be received within at least one of outer body upper section 102a and outer body lower section 102b. Elongated inner lower body 104 defines a cylindrical central bore 106 in fluid communication with an orifice plate 108 to define at least one exit orifice 110 that passes completely through the orifice plate 108.

Orifice plate 108 may be coupled to and retained within outer body lower section 102b using an orifice plate holder 112. Orifice plate holder 112 may be integrally formed with inner lower body 104, if desired. Alternately, orifice plate holder 112 is formed separately, as shown in the FIGS., to include a reduced diameter portion 114 spaced apart from an inner wall 116 of outer body lower section 102b. A supply fluid passageway 118 is formed therebetween. Reduced diameter portion 114 is hollow and receives a reduced diameter end portion 120 of inner lower body 104. Plate holder 112 may be fixed to inner lower body 104 and outer body lower section 102b via a process such as electron beam welding. Orifice plate holder 112 also includes a central bore 124 coaxially aligned with central bore 106 and having a smaller inner diameter than central bore 106. A plurality of passageways 125 extend through plate holder 112 to fluidly interconnect passageway 118 with a cavity 126 formed between reduced diameter end portion 120 and central bore 124.

A valve member 130 is slidably mounted within central bore 106. Valve member 130 includes an elongated pintle 132 having a conically shaped first end 134 and an opposite second end 136. Conical end 134 is selectively engageable with valve seat 140 to define a sealed and closed position of valve member 130 when seated. An unsealed, opened position exists when pintle 132 is unseated from valve seat 140. Valve seat 140 surrounds exit orifice 110. The valve seat may be conically or cone-shaped as shown to complement the shape of conical end 134 of pintle 132 to restrict the flow of reagent through orifice 110. Depending on the application and operating environment, pintle 132 and orifice plate 108 may be made from a carbide material, which may provide desired performance characteristics and may be more easily and cost-effectively manufactured. In addition, limitations or disadvantages associated with other materials may be avoided, such as those associated with manufacturing complex part shapes. Carbide may provide additional advantages, such as insensitivity to brazing temperatures that may range from 870-980° C., as opposed to carbon steels and tool steels, which may distemper. Carbide may also provide an increased surface hardness when compared to the hardness achievable with most other steels. Carbide may also be advantageous with regard to overall wear resistance.

A pintle head 142 is fixed to end 136 of pintle 132. Pintle head 142 is slidably positioned within an enlarged bore 144 of inner lower body 104. A running-class slip fit between pintle head 142 and bore 144 provides an upper guide for valve member 130. A lower valve member guide is formed at the sliding interface between central bore 124 and pintle 132. Based on this arrangement, valve member 130 is accurately aligned with valve seat 140 and exit orifice 110.

A bottom surface 150 of pintle head 142 is spaced apart from a surface 152 of inner lower body 104 to define a cavity 154 in fluid communication with cavity 126 via a passageway 158 defined as a portion of central bore 106 that is not occupied by pintle 132. A passageway 160 extends through pintle head 142 to define a portion of a reagent return passageway.

A pole piece 164 having a first end 166 is sized to be received within bore 144. First end 166 of pole piece 164 is fixed to inner lower body 104 using a process such as electron beam welding. An opposite second end 168 of pole piece 164 is sealingly fitted within a bore 172 formed in outer body upper section 102a. A seal 176 separates an inlet passageway 178 from an outlet passageway 180 within outer body upper section 102a. Elongated pole piece 164 includes a central bore 184 extending therethrough. Central bore 184 is coaxially aligned with central bore 106. A counterbore 188 inwardly extends from second end 168 of pole piece 164 that is coaxially aligned with a counterbore 190 extending into pintle head 142. A compression spring 194 is positioned within counterbores 188, 190 to urge valve member 130 into engagement with seat 140.

An electromagnet assembly 200 is positioned within outer body upper section 102a as depicted in the FIGS. Electromagnet assembly 200 may include a plastic material 201 overmolded to encapsulate the other components of electromagnet assembly 200 therein. Electromagnet assembly 200 includes a coil of wire 202 wrapped around a bobbin 204. A two-piece flux frame 207 includes a first frame half 208 fixed to a second flux frame half 210 positioned to circumferentially surround wire 202 and bobbin 204. Pintle head 142 is constructed from a magnetic material such as 430 stainless steel such that electrical energization of coil 202 produces a magnetic field urging pintle head 142 toward pole piece 164. End 134 of pintle 132 becomes disengaged from seat 140 to allow reagent to flow through exit orifice 110. Coil 202 may be energized via access to a receptacle 211, for example, in response to a signal from electronic injection controller 14. Electronic injection controller 14 receives sensor input signals and determines when reagent is to be injected into the exhaust stream to provide selective catalytic reduction of $NO_x$ emissions.

Controller 14 also defines the reagent injection duration and reagent injection rate. Depending on the engine operating condition, load, ambient air temperature, exhaust temperature, and other factors, it may be desirable to control injector 100 to deliver a relatively wide range of reagent injection rates. To achieve this goal, it may be desirable to minimize the total time associated with moving pintle 132 from a seated position, to an open position, and returned to the seated position. Accurate control of the position of pintle head 142 may be achieved by providing a well defined magnetic circuit.

Flux frame half 210 includes a radially extending portion 214 generally extending along transverse line 216. Pintle head 142 includes an enlarged diameter portion 218 intersected by line 216. Both flux frame half 210 and pintle head 142 are made from a magnetic material. To further define the magnetic circuit, inner lower body 104 is constructed from a non-magnetic material such as 304 stainless steel. A portion of inner lower body 104 through which line 216 crosses includes a minimum cross-sectional thickness to minimize any interruption in magnetic flux.

A fluid sleeve assembly 220 is depicted as a three-piece assembly having a first flux bridge collar 224 and a second flux bridge collar 226 interconnected by a flux break 228, in some embodiments, or a flux bridge 228', in some embodiments. Fluid sleeve assembly 220 is shaped as an elongated hollow cylindrical member sized and positioned to define a portion of inlet passage 178. First and second seals 232, 234 assure that pressurized reagent continues to travel through inlet passage 178 and does not enter electromagnet assembly 200. Each of flux bridge collars 226 and 224 are substantially the same including a counterbore including a first inner cylindrical surface 238 with a first reduced inner diameter and a second inner cylindrical surface 240 defining a second larger inner diameter. The external surface of each flux collar is also stepped including a cylindrical surface 242 having a larger outer diameter than a second cylindrical surface 244. Flux break or bridge 228 is a substantially right circular cylinder having an inner surface 248 engaged and fixed to each reduced diameter outer surface 244. Outer surface 242 engages or is very minimally spaced apart from walls 252 and 254 that define circular apertures extending through flux frame halves 210, 208. First inner cylindrical surface 238 of flux bridge collar 224 is sized to closely fit inner lower body 104 and minimize any air gap through which line 216 intersects.

First inner cylindrical surface 238 of flux bridge collar 226 is sized to cooperate with an enlarged diameter portion 260 of pole piece 164. Flux frame half 208 includes a radially inwardly extending portion 264 extending along a line 266. Enlarged diameter portion 260 and flux bridge collar 226 are axially positioned to be aligned with line 266 and provide a magnet circuit pathway across injector 100. Flux frame halves 208 and 210 are constructed from a magnetic material such as 1018 low carbon steel. Flux bridge collars 224 and 226 are constructed from ferritic 430 stainless steel. Pole piece 164 is made from ferritic 430 stainless steel or a similar magnetic material. Pintle head 142 may be made from ferritic 430 stainless steel. In some embodiments, flux break 228 is made from non-ferritic and non-magnetic 304 stainless steel as is inner lower body 104. Constructing the previously described components from magnetic and non-magnetic materials as well as closely positioning the magnetic materials adjacent to one another along lines 216 and 266 greatly improves the magnetic circuit performance associated with electromagnet assembly 200. Benefits may include the use of a smaller coil wire, a lesser number of turns of wire, and a reduced quantity of electric current to provide an improved electromagnetic actuator having lower cost, reduced size and mass. Increased control regarding the position of valve member 130 is also realized. It should also be appreciated that the transverse planes defined by the ends of cylindrical wire coil 202 may be interpreted as part of the magnetic circuit as well as the planes containing lines 216 and 266. At least one of these transverse planes cuts through pintle head 142, flux bridge collars 224, 226 and enlarged diameter pole piece portion 260.

Figure 5:
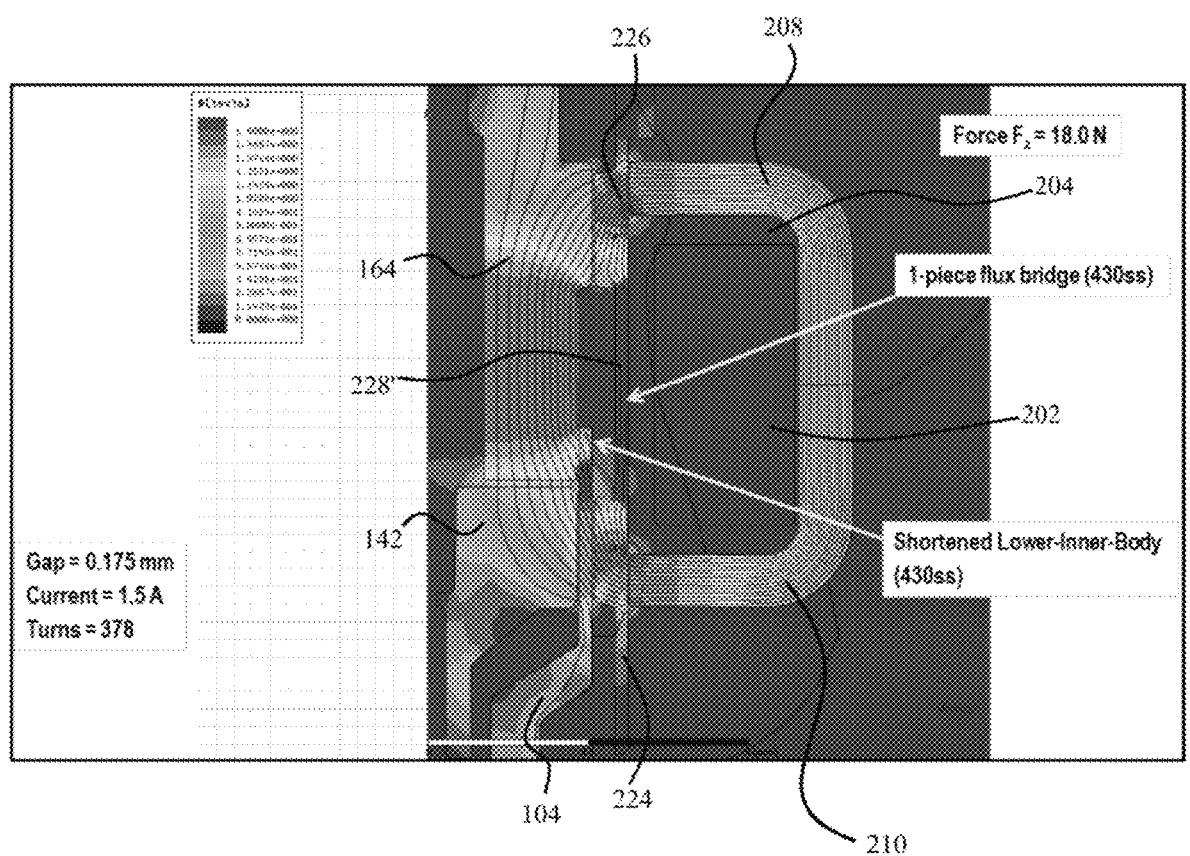
FIG. 5 is an enlarged cross-sectional view illustrating the magnetic flux density of an embodiment having a single-piece magnetic portion extending between the two magnetic portions of the flux sleeve.
Figure 6:
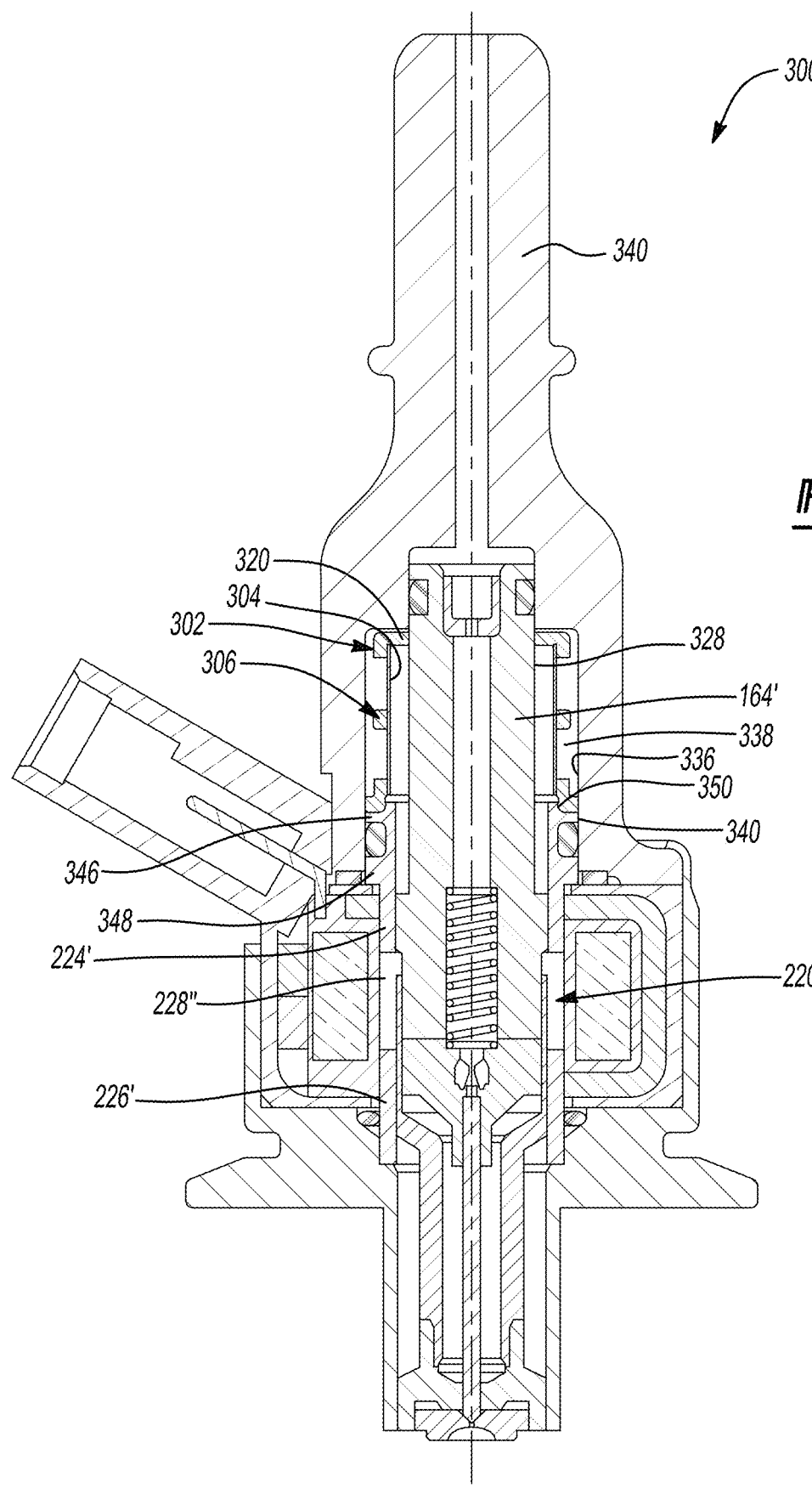
FIG. 6 is a cross-sectional view of an injector including a cage filter.
Figure 7:
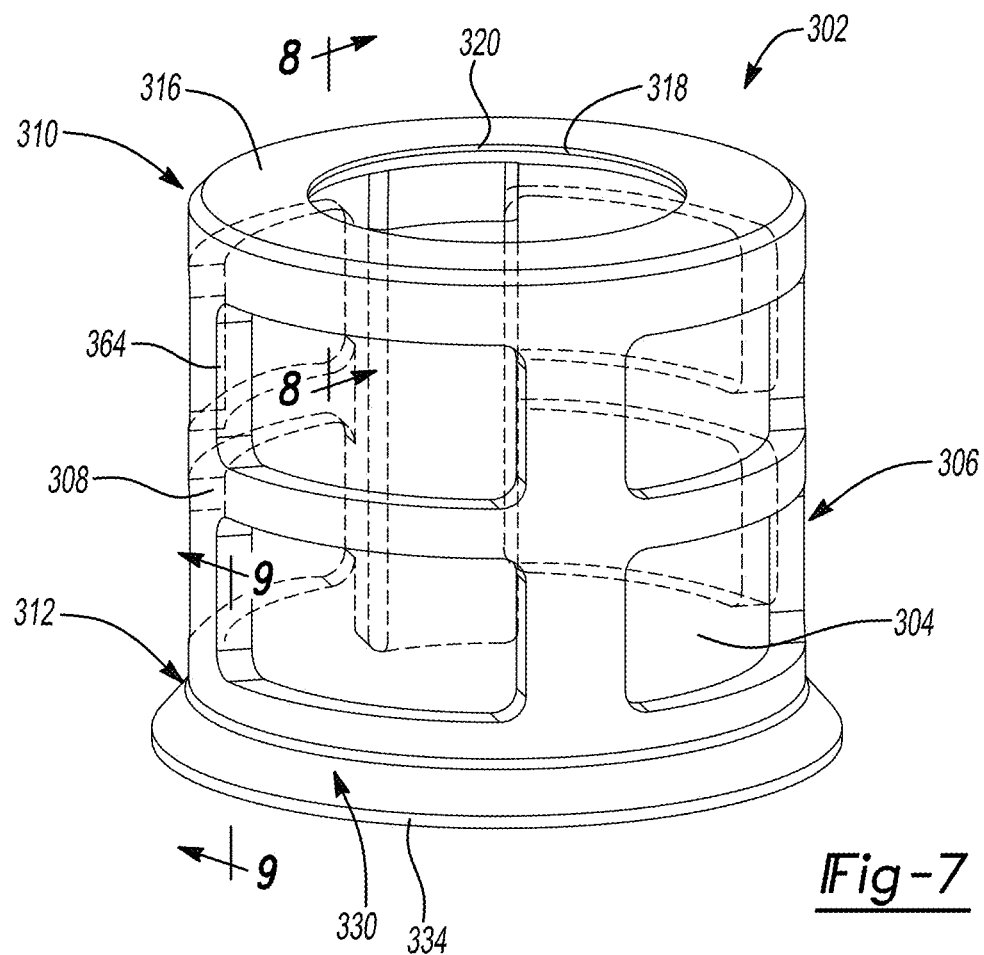
FIG. 7 is a perspective view of the cage filter shown in FIG. 6.
Figure 8:
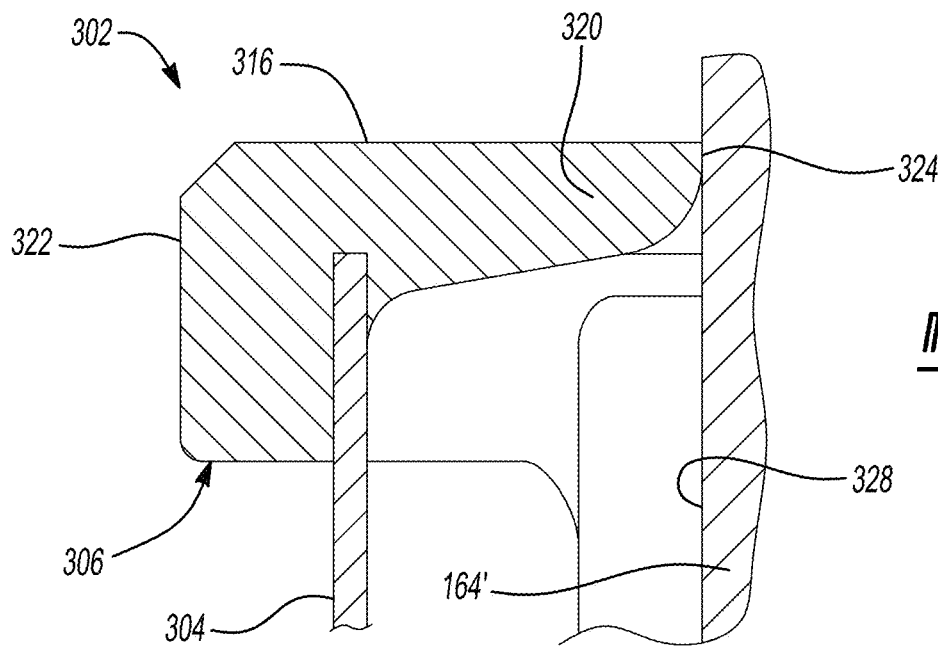
FIG. 8 is a fragmentary cross-sectional view of a portion of the injector including the cage filter.
Figure 9:
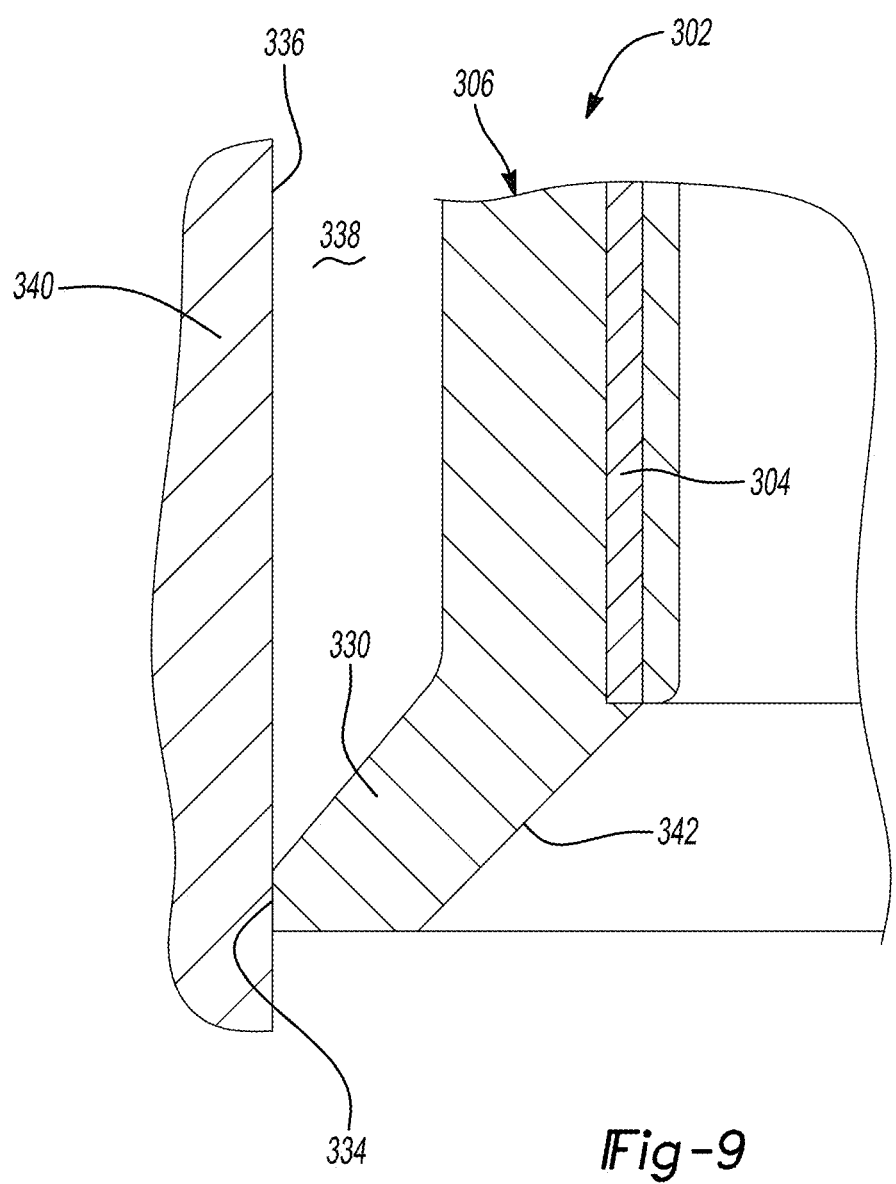
FIG. 9 is a fragmentary cross-sectional view of another portion of the injector including the cage filter.

In some embodiments, flux bridge 228' is made of a magnetic material, such as ferritic 430 stainless steel. In this embodiment, flux bridge 228' is similarly magnetic as flux bridge collars 224, 226. Constructing the previously described components from magnetic and non-magnetic materials as well as closely positioning the magnetic materials adjacent to one another along lines 216 and 266 greatly improves the magnetic circuit performance associated with electromagnet assembly 200 as illustrated in FIG. 5. Benefits may include the use of a smaller coil wire, a lesser number of turns of wire, and a reduced quantity of electric current to provide an improved electromagnetic actuator having lower cost, reduced size and mass. Increased control regarding the position of valve member 130 is also realized. It should also be appreciated that the transverse planes defined by the ends of cylindrical wire coil 202 may be interpreted as part of the magnetic circuit as well as the planes containing lines 216 and 266. At least one of these transverse planes cuts through pintle head 142, flux bridge collars 224, 226, flux bridge 228', and enlarged diameter pole piece portion 260.

As illustrated in FIG. 5, in some embodiments, flux bridge collars 224, 226 and flux bridge 228' can be a single unitary member. In this way, flux bridge collars 224, 226 and flux bridge 228' constitute portions or regions of a continuous member. In some embodiments, flux bridge collars 224, 226 and flux bridge 228' can comprise a plurality of discrete members similarly configured and oriented as flux bridge collars 224, 226 and flux break 228. Embodiments employing flux bridge 228' extending between flux bridge collars 224 can define an enhanced and/or increased flux density extending along flux bridge 228'. To further enhance and/or increase the flux density, in some embodiments, the length of enlarged bore 144 of inner lower body 104 can be shortened, as illustrated in FIG. 5 in comparison with FIG. 4.

A reagent fluid path is defined within injector 100 when pintle 132 is in the closed position. The fluid path provides for circulation of fluid through injector 100. More particularly, the reagent fluid path extends from an inlet 270 of outer body upper section 102a through an inlet filter 268 and inlet passageway 178 including a gap between an outer surface of pole piece 164 and outer body upper section 102a, through fluid sleeve assembly 220, fluid passageway 118, the paths formed in plate holder 112 through cavity 126, passageway 158, passageway 160, central bore 184, outlet passageway 180, a restrictor orifice 272, an outlet filter 274, to exit outlet 278. Typically, reagent entering inlet 270 is at a first relatively cool temperature compared to the exhaust passing through exhaust system 18 in close proximity to orifice 110. The recirculation of reagent through injector 100 transfers heat from orifice plate 108 and orifice plate holder 112. The recirculation of reagent also assists in transferring heat from coil 202 because bobbin 204 is placed in close contact with fluid sleeve assembly 220 through which reagent flows.

When coil 202 is electrically energized, a magnetic field is generated and pintle head 142 is urged against the biasing force of spring 194 to unseat pintle end 134. Pressurized reagent located within cavity 126 passes between pintle 132 and seat 140 and through exit orifice 110 to inject reagent into an exhaust stream flowing through exhaust system 18. Electromagnet assembly 200 may be controlled by any number of methods including pulse width modulation to open and close exit orifice 110 at a predetermined frequency.

In an alternate embodiment depicted in FIGS. 6-9, an injector 300 is constructed substantially similarly to the previously defined injector 100. To avoid reiteration, only the differences in the embodiments will be described in detail. It should be appreciated that the description of similar components shown in FIGS. 1-5 applies to injector 300.

Injector 300 includes a cage filter 302 that may be provided in addition to or in lieu of one or both inlet filter 268 and outlet filter 274. Cage filter 302 includes a porous filter 304 fixed to a cage 306. Filter 304 is a substantially hollow cylindrically-shaped member configured to allow injected urea to freely flow therethrough but restrict contaminants from further flowing through injector 300. Cage 306 includes a substantially cylindrically-shaped hollow body 308 having a first end 310 and an opposite second end 312. Cage 306 includes an end wall 316 positioned at first end 310. An aperture 318 extends through end wall 316. End wall 316 includes an integrally formed first lip seal 320 depicted in FIG. 8. When viewed in cross-section, end wall 316 reduces in thickness from an outer cylindrical surface 322 to an inner circumferential surface 324 that define aperture 318. First lip seal 320 is configured to deflect and/or slightly plastically and/or elastically deform when assembled to pole piece 164' to sealingly engage an outer cylindrical surface 328 of pole piece 164' in an interference fit.

Cage 306 includes a radially outwardly extending flange 330 integrally formed with body 308 and positioned at second end 312. Flange 330 extends radially outwardly and axially away from body 308 at an angle of approximately 45 degrees. An outer cylindrical surface 334 of flange 330 is sized to provide interference fit with an inner cylindrical surface 336 of a bore 338 of an injector housing 340 previously described as outer body upper section 102a. Flange 330 defines a second seal that acts as a lip seal. Flange 330 deforms plastically and/or elastically to form a tight fit with inner cylindrical surface 336.

Flange 330 includes a seat 342 positioned in engagement with fluid sleeve assembly 220'. Fluid sleeve assembly 220' is constructed substantially similar to fluid sleeve assembly 220 in that it is three-piece assembly having flux bridge collars 224' and 226' on opposite ends constructed from ferritic 430 stainless steel or a similar ferritic material. Flux bridge collars 224' and 226' are interconnected by flux break 228", in some embodiments, or a flux bridge 228" in other embodiments. Flux break 228" is constructed from a non-ferritic and non-magnetic 304 stainless steel or similar material. Flux bridge 228" is similarly constructed to flux bridge collars 224', 226'.

Flux bridge collar 224' includes first and second radially extending flanges 346, 348, respectively. First flange 346 engages seat 342 of cage filter 302. First flange 346 is axially offset from an end of first flux bridge collar 224' such that an axially extending portion 350 of first flux bridge collar 224' acts to guide and align cage 306.

It is contemplated that cage 306 is constructed from Nylon 6,6 having 30% glass reinforcement. The mesh may be constructed from a metal or a plastic. In the instant example, mesh 304 is constructed from Nylon 6,6 having apertures extending therethrough and being sized at approximately 40 microns. Body 308 includes a plurality of windows 364 extending therethrough. Each window is covered by a portion of mesh 304. For fluid to pass through cage filter 302, fluid must pass through mesh 304.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An injector for injecting a reagent, the injector comprising:
    a housing;
    an axially translatable valve member positioned within the housing;
    an electromagnet positioned within the housing and including a coil of wire circumscribing at least a portion of the axially translatable valve member, wherein the axially translatable valve member moves between a seated position and an unseated position in response to energizing the electromagnet;
    a flux frame surrounding the coil of wire, the flux frame including a first and second radially extending portions axially spaced apart from one another, extending along parallel planes positioned on opposite sides of the coil of wire;
    a flux sleeve including two magnetic flux bridge collar portions interconnected by one of a magnetic flux bridge portion and a non-magnetic flux break portion, each of the two magnetic flux bridge collar portions being intersected by one of first and second planes in which the first and second radially extending flux frame portions lie to define flux bridges, the one of a flux bridge portion and a flux break portion being surrounded by the coil of wire and axially positioned between the parallel planes;
    a tubular pole piece disposed within the housing, wherein the tubular pole piece defines a return passageway for reagent to flow when the axially translatable valve member is at at least one of the seated position and the unseated position; and
    a filter positioned within the housing and surrounding the tubular pole piece, the filter including a cage and a mesh fixed to the cage, the mesh covering windows extending through the cage, the cage having a deformable first seal biasedly engaging an outer surface of the tubular pole piece, the cage including a second seal biasedly engaging the housing, the deformable first seal and the second seal defining a closed volume between the housing and the filter such that all of the reagent flowing through the injector passes through the mesh.

2. The injector of claim 1, wherein the deformable first seal and the second seal are integrally formed with the cage, wherein the cage, the deformable first seal, and the second seal define a one-piece structure.

3. The injector of claim 2, wherein the cage is overmolded on the mesh.

4. The injector of claim 1, wherein the deformable first seal radially inwardly extends from the mesh and the second seal radially outwardly extends from the mesh.

5. The injector of claim 1, wherein the mesh is shaped as a hollow right circular cylinder.

6. The injector of claim 1, wherein the cage includes a cup-shaped structure having the deformable first seal positioned at an opposite end relative to the second seal.

7. The injector of claim 1, wherein the cage is constructed from Nylon 6,6 material.

8. The injector of claim 1, wherein the first deformable seal and the second seal are deformable lip seals.

9. The injector of claim 1, wherein the second seal is shaped as a radially outwardly extending flange that forms a 45 degree angle with a longitudinal axis of the injector.

10. The injector of claim 1, wherein the tubular pole piece extends through an entire filter and protrudes beyond the axial extent of the filter in each direction.

11. The injector of claim 1, wherein the flux sleeve includes three coaxially aligned tubes connected to each other.

12. The injector of claim 1, wherein the flux sleeve is a continuous member including the two magnetic flux bridge collar portions and the one of the magnetic flux bridge portion and non-magnetic flux break portion.

13. The injector of claim 1, wherein the reagent is directed to flow through the flux sleeve.

14. The injector of claim 1, wherein the tubular valve member includes a cylindrical pintle coupled to an enlarged pintle head, the enlarged pintle head being made from a magnetic material and positioned such that one of the planes intersects the enlarged pintle head when the tubular valve member is at the seated position.

15. The injector of claim 1, wherein the tubular pole piece forms an interference fit with the deformable first seal, the second seal, and the housing defining another interference fit.

16. The injector of claim 1, wherein the tubular pole piece is axially positioned within the coil of wire.

17. An injector for injecting a reagent, the injector comprising:
    a housing;
    an axially translatable valve member positioned within the housing;
    a pole piece disposed within the housing;
    an electromagnet positioned within the housing and including a cylindrically-shaped coil of wire, wherein the axially translatable valve member moves between a seated position and an unseated position in response to energizing the electromagnet;
    a flux sleeve passing through the cylindrically-shaped coil of wire and including two magnetic portions interconnected by one of a magnetic flux bridge portion and a non-magnetic flux break portion, each of the magnetic portions being aligned with transverse planes defined by ends of the cylindrically-shaped coil of wire wherein a reagent flow path extends between the flux sleeve and the pole piece; and
    a filter positioned within the housing and surrounding the pole piece, the filter including a cage and a mesh fixed to the cage, the mesh covering windows extending through the cage, the cage having a deformable first seal biasedly engaging an outer surface of the pole piece, the cage including a second seal biasedly engaging the housing, the cage also including a seat engaging the flux sleeve, the deformable first seal and the second seal defining a closed volume between the housing and the filter such that all of the reagent flowing through the injector passes through the mesh.

18. The injector of claim 17, wherein the deformable first and the second seal are integrally formed with the cage, wherein the cage, the deformable first seal, and the second seal define a one-piece structure.

19. The injector of claim 17, wherein the deformable first seal radially inwardly extends from the mesh and the second seal radially outwardly extends from the mesh.

20. The injector of claim 17, wherein the deformable first seal and the second seal are deformable lip seals.

\* \* \* \* \*